Jan. 7, 1964
A. M. MARKS ETAL
3,117,176
AIRCRAFT GLIDE PATH RADIUS VECTOR AND
ALTITUDE INDICATING SYSTEM
Filed Oct. 12, 1961
2 Sheets-Sheet 2
FIG. 4
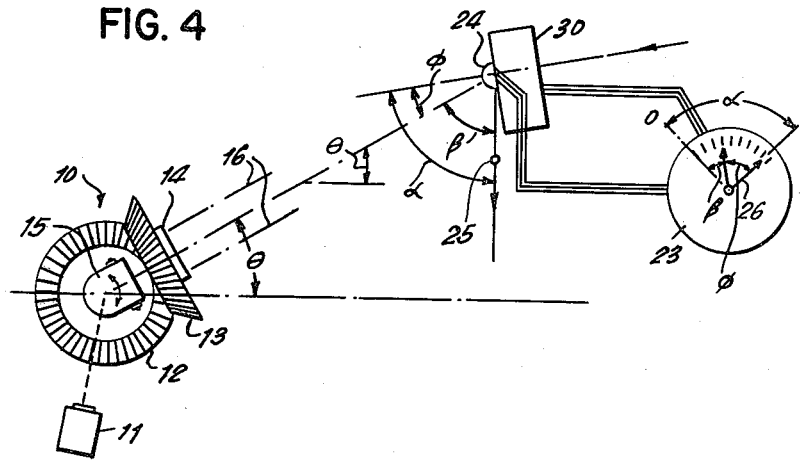
FIG. 5
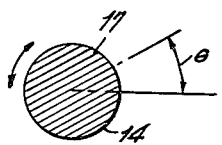
FIG. 6
FIG. 7
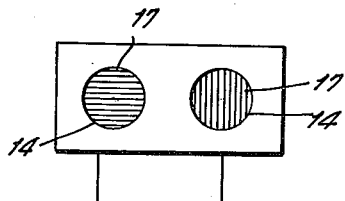
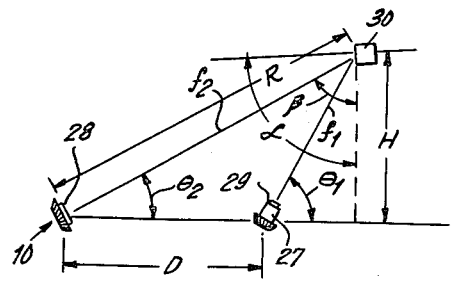
FIG. 8
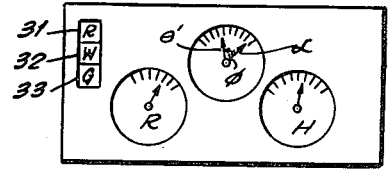
FIG. 9
INVENTORS
ALVIN M. MARKS
MORTIMER M. MARKS
BY BEATRICE L. MARKS
Albert F. Kronman
ATTORNEY

United States Patent Office 3,117,176
Patented Jan. 7, 1964

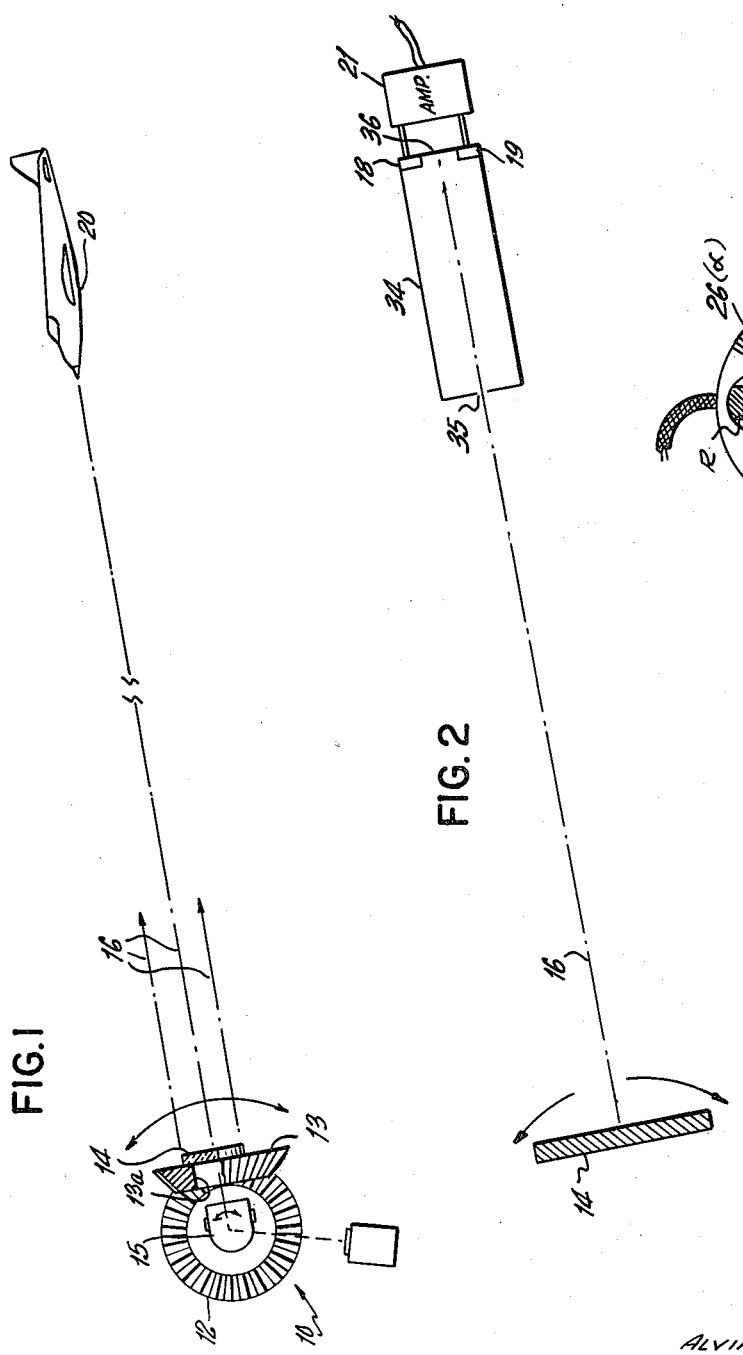

3,117,176
AIRCRAFT GLIDE PATH RADIUS VECTOR AND ALTITUDE INDICATING SYSTEM
Alvin M. Marks, Mortimer M. Marks, and Beatrice L. Marks, Whitestone, N.Y., assignors to Marks Polarized Corporation, Whitestone, N.Y., a corporation of New York
Filed Oct. 12, 1961, Ser. No. 144,722
12 Claims. (Cl. 88—14)

This invention relates to aircraft systems and particularly to a system which will indicate the glide path, radius vector, and altitude of aircraft preparing to land.

Presently known aircraft approach guidance systems are accurate until the aircraft reaches a distance approximately 2½ to 3 miles from the runway. From this distance to the touchdown point the success of the landing is due largely to the skill of the pilot. However, it is this last few hundred yards which may make a difference between a successful landing and a disaster.

Accordingly, it is an object of the present invention to provide an aircraft landing guidance system which will accurately indicate to a pilot his glide path angle, altitude and radius vector at low altitudes.

Another object of the present invention is to provide a poor weather glide path indicator.

A further object of the present invention is to provide a glide path indicator which will continue to operate to within a few hundred feet of a touchdown point.

Still another object of the present invention is to provide a relatively simple highly accurate and reliable glide path, radius vector, and altitude indicating system.

An object of the present invention is to provide a direct reading aircraft landing system.

Still another object of the present invention is to provide a system which is compatible with electronic control for automatic flight guidance.

A feature of the present invention is the use of a beam of polarized light to indicate the glide path angle.

A further feature of the present invention is its use of spaced light beams to indicate the radius vector, and altitude of an aircraft in flight.

Still another feature of the present invention is the use of a sweeping reciprocating beam of polarized light for aircraft guidance.

A feature of the present invention is the use of light of different frequencies in each of the polarized light beams comprising elements of the guidance system.

Still another feature of the present invention is the use of two polarizers having their axis of polarization disposed at 90° with respect to each other in front of photo-cell sensors, to derive an output voltage ratio which is independent of the distance of the aircraft from the light source.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts and in which:

FIGURE 1 is a somewhat diagrammatic view of an aircraft glide path radius vector, and altitude indicating system according to the present invention.

FIGURE 2 is a somewhat diagrammatic view showing the manner in which a polarized light beam is received by the aircraft for determining the proper glide path, radius vector and altitude of the plane.

FIGURE 3 is a view in side elevation of the glide path indicating gauge of the guide system in accordance with the present invention.

FIGURE 4 is a view similar to FIGURE 1, illustrating the angular relationships and other moments of the present system.

FIGURE 5 is a view in front elevation of a light polarizer as used in the present invention, with the plane of polarization shown as a series of parallel lines.

FIGURE 6 is a diagrammatic view showing a portion of the aircraft light receiving apparatus for the projected polarized beams.

FIGURE 7 is a side view of the apparatus shown in FIGURE 6.

FIGURE 8 is a diagrammatic view of the complete installation of a glide path, radius vector and altitude indicating system showing the geometric relationships of the various elements and the aircraft.

FIGURE 9 is a diagrammatic view of an instrument panel for the present invention.

Referring to the drawings and specifically to FIGURES 1 and 2, 10 indicates a projection unit located at the foot of a landing strip threshold having a motor 11 or other source of rotary power connected to a large bevel gear 12. The bevel gear 12 is in mesh with a driven bevel gear 13, upon which there is supported a light polarizer 14 carried at the front of a light source 15. The projection unit 10 projects a beam of polarized light indicated by the dashed lines 16. The motor 11 turns the bevel gear 12 and also imparts a sweeping reciprocating motion to the beam 16. The sweep angle of the beam 16 is regulated to cover for example, the range between 1° and 2½° with respect to the horizontal. As the driven gear 13 is rotated by the large bevel gear 12, the polarizer 14 overlying the opening 13a in the hub of the gear 13 will also rotate. The gear ratio between the large bevel gear 12 and the driven bevel gear 13 will be greater than 1:1, for example, 10:1, or 100:1, depending on the degree of accuracy which must be achieved for the glide path angle reading.

Referring to FIGURE 5, it will be seen that the plane of polarization indicated by the lines 17 of the light polarizer 14 is disposed so as to coincide with the angular disposition of the light source 15 with respect to the horizontal. This angle is indicated by $\theta$ in FIGURE 5.

The projected light beam 16 having its plane of polarization at an angle $\theta$ with respect to the horizontal is picked up by a pair of photo cells 18, 19, which are suitably carried by the aircraft 20, as diagrammatically indicated in FIGURE 2. Each of the photo cells 18, 19, is equipped with a light polarizing filter so arranged that their planes of polarization are normal with respect to each other. Two signals are thus derived by the photo cells 18, 19, from the polarized beam 16. One signal is referenced to a horizontal plane and the other to a vertical plane. These signals are fed into an electronic circuit indicated at 21 in FIGURE 2.

The electronic circuit 21 by means well known in the electronic art provides an output voltage corresponding to the ratio of the light intensity of the two input signals. Since the light intensity coming from the projector 10 is a function of the angle $\theta$ as well as of the distance of the photo cells 18, 19, from the projection unit, it is important to eliminate the distance variable from the system. Since the distance factor effects both the vertical and horizontal signals equally, the ratio of the component intensities provides an output voltage ratio which is independent of distance. The electronic circuit output voltage is used to actuate a servo motor (not shown). The motor drives a pointer 22 on the face of an indicator 23, best shown in FIGURE 3. The pointer indicates the angle $\theta'$ where $\theta'$ is equal to $(90°-\theta)$ the glide path angle of the aircraft.

Referring to FIGURE 4 there is shown the apparatus by means of which the position of the aircraft with respect to the vertical direction is indicated. It will be seen that a servo motor 24 is keyed to a vertical indicator device such as the pendulum 25 or a gyro (not shown). The servo motor 24 actuates a pointer 26 on the indicator 23 which denotes the angle α, made by the directional plane of the aircraft 20 and the vertical plane.

When the pilot wishes to land he adjusts the angle of the aircraft, α so that the resulting angle $\beta = 90° - \theta$ shown on the indicator 23 corresponds to a predetermined value of glide path angle suitable for landing. The pilot uses the angle $\theta = (\alpha - \beta)$ as the visual reference for guiding the aircraft. Thus, when angles α and β coincide, ($\alpha = \beta$, and $\theta = 0$), the glide angle then corresponds to the predetermined glide angle θ and the aircraft is proceeding directly on the preselected glide path.

If the speed of the approaching aircraft is assumed to be 150 mi. per hr. and the projector 10 is sweeping at the rate of 30 times per min., the position of the aircraft will be indicated every two seconds. The pilot is then one minute from touchdown if the first signal were received at a distance of 2½ miles from the projector 10, and is capable of 30 signals to enable adjustment to the proper glide path.

Where it is desired to determine, in addition to the glide path and altitude of the plane, its radius vector, that is, its distance to the start to the runway, the system diagrammatically indicated in FIGURE 8 is employed. In this arrangement two projection units 10, 27, are provided at a predetermined distance D apart. The projection unit 10 is located at the foot of the runway and the second projection unit 27 is disposed at the known distance D from the first. The sweep of the projectors 10 and 27 are the range between for example, 0 and 10°.

The sweeping speed of the projector 27 is set at several times that of projector 10 to provide an infinite focus of intersection points of the two beams within a given beam sensing envelope.

Both projection units 10, 27, are equipped with linear polarizers 14, capable of rotating in accordance with the sweep angle as hereinabove set forth. In addition, the projectors 10, 27, are also covered by band pass filters 28 and 29 respectively. These filters permit only light of a specific frequency to be transmitted from each unit. The transmitted frequencies may be selected in a visible range or in the infra-red band or even in the mm. or micro-wave region where a greater fog penetration is required.

In the system illustrated in FIGURE 8 two pairs of sensors, such as, photo cells generally indicated at 30 in FIGURE 8, are installed on the exterior of the aircraft. One pair of sensors, such as, photo cells is provided with band pass filters corresponding to the filter 28 and the second pair of photo cells is provided with a band pass filter corresponding to band pass filter 29. The respective sensors (photo cells) will thus sense only the corresponding frequency of the light transmitted from the projector with the matching band pass filter. Each of the sensors (photo cells) pairs corresponding to a given light frequency is provided with one polarizer installed with its plane of polarization on a horizontal plane and a second with its plane of polarization on a vertical plane.

In operation the light beam of these two frequencies are sensed by their respective photo cell pairs and the angles $\theta'_1$ and $\theta'_2$, corresponding to $\theta_1$ and $\theta_2$ are computed electronically in the same manner described above for the glide path indicator device. Thus, by knowing $\theta'_1$ and $\theta'_2$ and the fixed distance D between the projectors 10 and 27, the distance of the aircraft from the foot of the runway, known as the radius vector R, and the height H of the aircraft above the ground can be computed electronically and displayed instantaneously on an indicator such as is shown in FIGURE 9.

To guide the aircraft the pilot adjusts the angle of the aircraft with respect to the vertical so that the resulting angle $\theta'_1$ shown on the indicator is equal to α and corresponds to a predetermined value of glide path angle $\theta_1$, as explained in connection with FIGURE 4.

In order to enable the pilot to rapidly adjust his glide path to the proper angle, light having three individual colors such as the red, white and green light shown on the panel of FIGURE 9 may be provided.

The lights 31, 32, 33, are connected to the photo cells 18, 19, in the light collimator 34 shown in FIGURE 2. The light collimator 34 consists of an elongated tube or box having a slit 35 at the front thereof. The collimator 34 carries the photo cells 18, 19, on the rear wall thereof so that the light beam 16 will strike one of the photo cells 18, 19, or the area 36 between them depending upon the angle of the collimator 34 and therefore the plane with respect to the beam 16. Thus, if the glide angle is too flat the beam 16 will hit the photo cell 18 and the red light will flash on the panel shown in FIGURE 8. If the glide angle is too steep the beam 16 will strike the photocell 19, and the green light will flash. If the glide angle is correct the beam 16 will strike the area 36 between the two photo cells 18, 19, and the normally closed white light switch (not shown) will remain in operation. In this manner, a visual warning is available to the pilot during his landing approach.

From the foregoing it will be seen that there has been provided a simplified direct reading and compact glide path, altitude and radius vector indicating system which will continue to give the pilot the information necessary to enable him to make a perfect landing until the aircraft reaches the runway.

Having thus fully described the invention, what is claimed as new and desired to be secured by Letters Patent of the United States, is:

1. An aircraft landing strip glide path indicating system comprising a light projection unit supported by the landing strip, a linear light polarizing filter in front of the light projector, means to move the light projector and polarizing filter through a vertical sweep angle and synchronously rotate the said polarizing filter to produce a sweeping beam of polarized light whose plane of polarization bears a specific relationship to its elevation, at least one reference light polarizing filter carried by the aircraft to receive the polarized beam from the projector and means to derive a signal from the light passing through the reference filter to indicate the glide path angle of the aircraft.

2. An aircraft landing strip glide path indicating system comprising a light projection unit supported by the landing strip, a linear light polarizing filter in front of the light projector, means comprising a source of rotary power to move the light projector and polarizing filter through a vertical sweep angle and means driven by the source of rotary power to synchronously rotate the said polarizing filter to produce a sweeping beam of polarized light whose plane of polarization bears a specific relationship to its elevation, at least one reference light polarizing filter carried by the aircraft to receive the polarized beam from the projector and means to derive a signal from the light passing through the reference filter to indicate the glide path angle of the aircraft.

3. A device according to claim 2 in which the driven means comprises a first gear coupled to the source of rotary power, a second gear in mesh with the first gear, said second gear having the polarizing filter mounted thereon.

4. A device according to claim 2 in which the driven means comprises a first vertically disposed bevel gear driven by the power source, a second vertically disposed bevel gear in mesh with the first gear and lying in a plane normal to the light beam and in which the polarizing filter is carried by the second gear and rotates with it in front of the said light beam.

5. An aircraft landing strip glide path indicating system comprising a light projection unit supported by the landing strip, a linear light polarizing filter in front of the light projector, means to move the light projector and polarizing filter through a vertical sweep angle and synchronously rotate the said polarizing filter to produce a sweeping beams of polarized light whose plane of polarization bears a specific relationship to its elevation, at least one reference light polarizing filter carried by the aircraft to receive the polarized beam from the projector and means including at least one photo-cell, to receive the light passing through the reference polarizer to derive a signal from the light passing through the reference filter to indicate the glide path angle of the aircraft.

6. An aircraft landing strip glide path indicating system comprising a light projection unit supported by the landing strip, a linear light polarizing filter in front of the light projector, means to move the light projector and polarizing filter through a vertical sweep angle and synchronously rotate the said polarizing filter to produce a sweeping beam of polarized light whose plane of polarization bears a specific relationship to its elevation, spaced reference light polarizing filters carried by the aircraft to receive the polarized beam from the projector and means to derive a signal from the light passing through the reference filters to indicate the glide path angle of the aircraft.

7. A device according to claim 5 in which the linear light polarizing filter on the projector is disposed with its plane of polarization equal to the angular disposition of the projected beam with respect to the horizontal.

8. A device according to claim 6 in which the reference light polarizing filters are disposed with their planes of polarization at right angles to each other and the signal deriving means produces an output voltage corresponding to the ratio of the light passing through the two reference filters to eliminate the distance variable from the system.

9. An aircraft landing strip glide path indicating system comprising a light projection unit supported by the landing strip, a linear light polarizing filter in front of the light projector, means to move the light projector and polarizing filter through a vertical sweep angle and synchronously rotate the said polarizing filter to produce a sweeping beam of polarized light whose plane of polarization bears a specific relationship to its elevation, at least one reference light polarizing filter carried by the aircraft to receive the polarized beam from the projector, means to indicate the directional angle of the aircraft with respect to the vertical and means to derive a signal from the light passing through the reference filter to indicate the glide path angle of the aircraft.

10. An aircraft landing strip glide path indicating system comprising a light projection unit supported by the landing strip, a linear light polarizing filter in front of the light projector, means to move the light projector and polarizing filter through a vertical sweep and synchronously rotate the said polarizing filter to produce a sweeping beam of polarized light whose plane of polarization bears a specific relationship to its elevation, at least one reference light polarizing filter carried by the aircraft to receive the polarized beam from the projector and means including spaced photocells carried by the aircraft, a collimator to receive the projected light, switch means connected to the photocells to indicate the angular disposition of the aircraft with respect to the projected beams and means to derive a signal from the light passing through the reference filter to indicate the glide path angle of the aircraft.

11. An aircraft landing strip glide path, radius vector and altitude indicating system comprising spaced first and a second light projection units supported by the landing strip, a linear light polarizing filter in front of each of the light projectors, means to move the light projectors and their polarizing filters through a vertical sweep angle and synchronously rotate the polarizing filters whereby the plane of polarization of the filters bears a specific relationship to the elevation of the projected light beam, means to regulate the respective speeds of the two projection units to provide an infinite focus of intersection points of their respective beams, a first and a second pair of sensors carried by the aircraft to receive the light from each of the beams, filter means between the sensors and their respective projectors to limit each pair of sensors to one of the projected beams and means to derive from the sensors the glide path, radius vector and altitude of the aircraft.

12. An aircraft landing strip glide path, radius vector and altitude indicating system comprising a spaced first and a second light projection unit supported by the landing strip, a linear light polarizing filter in front of each of the light projectors, a first band pass filter in front of the first light projector, a second band pass filter of different frequency from the first band pass filter in front of the second light projector, means to move the light projectors and their polarizing filters through a vertical sweep angle and synchronously rotate the polarizing filters whereby the plane of polarization of the filters bears a specific relationship to the elevation of the projected light beam, means to regulate the respective speeds of the two projection units to provide an infinite focus of intersection points of their respective beams, a first and a second pair of sensors carried by the aircraft to receive the light from each of the beams, a linear light polarizer in front of each sensor in the sensor pairs, said polarizers disposed with their planes of polarization normal to each other, filter means between the sensors and their respective projectors to limit each pair of sensors to one of the projected beams and means to derive from the sensors the glide path, radius vector and altitude of the aircraft.

No references cited.